United States Patent
Bouskila

(12) 
(10) Patent No.: US 6,727,677 B1
(45) Date of Patent: Apr. 27, 2004

(54) ADAPTER INTERFACE UNIQUE TO EACH MODEL MOBILE TELEPHONE WITH STANDARDIZED CHARGER

(76) Inventor: Moshe Bouskila, 2056 E. 21$^{St}$ St., Brooklyn, NY (US) 11229

( * ) Notice: Subject to any disclaimer, the term of this patent is extended or adjusted under 35 U.S.C. 154(b) by 0 days.

(21) Appl. No.: 10/338,152

(22) Filed: Jan. 8, 2003

(51) Int. Cl.$^7$ ................................. H02J 7/00
(52) U.S. Cl. ...................................... 320/107
(58) Field of Search ................ 320/107, 110, 320/111, 112, 114, 115; 429/9, 97, 99, 123; 439/620, 560, 627, 638; 455/89

(56) References Cited

U.S. PATENT DOCUMENTS

| | | | | |
|---|---|---|---|---|
| 4,229,686 A | | 10/1980 | Mullersman et al. ........ | 320/113 |
| 4,946,396 A | * | 8/1990 | Saitoh ...................... | 439/638 |
| 5,280,229 A | | 1/1994 | Faude et al. ............... | 320/110 |
| 5,564,943 A | * | 10/1996 | Weiss ....................... | 439/638 |
| 5,592,064 A | | 1/1997 | Morita ...................... | 320/112 |
| 5,733,674 A | | 3/1998 | Law et al. .................. | 429/9 |
| 5,762,512 A | | 6/1998 | Trant et al. ................ | 439/347 |
| 5,977,747 A | * | 11/1999 | Huang ....................... | 320/107 |
| 6,007,373 A | * | 12/1999 | Chew ........................ | 439/500 |
| 6,014,010 A | | 1/2000 | Yao .......................... | 320/110 |

* cited by examiner

*Primary Examiner*—Pia Tibbits
(74) *Attorney, Agent, or Firm*—Steven Horowitz

(57) ABSTRACT

A charger and adapter interface assembly compatible with any nonremovable rechargeable battery of a mobile telephone comprises a charger element having a male connecting member of standard size and shape and an adapter interface having a female cavity on a first side to removably receive the male connecting member to make the adapter interface electrically in contact with the charger element and on a second side the adapter interface has a second male connecting member uniquely compatible with a recess on a wall of a mobile telephone so the battery is in electrical contact with the adapter interface. The recess is unique for a particular model of mobile telephone. The adapter interface is light enough and compact so the adapter interface stays attached to the mobile telephone regardless of the orientation of the telephone and does not interface with a user holding and speaking on the mobile telephone.

10 Claims, 3 Drawing Sheets

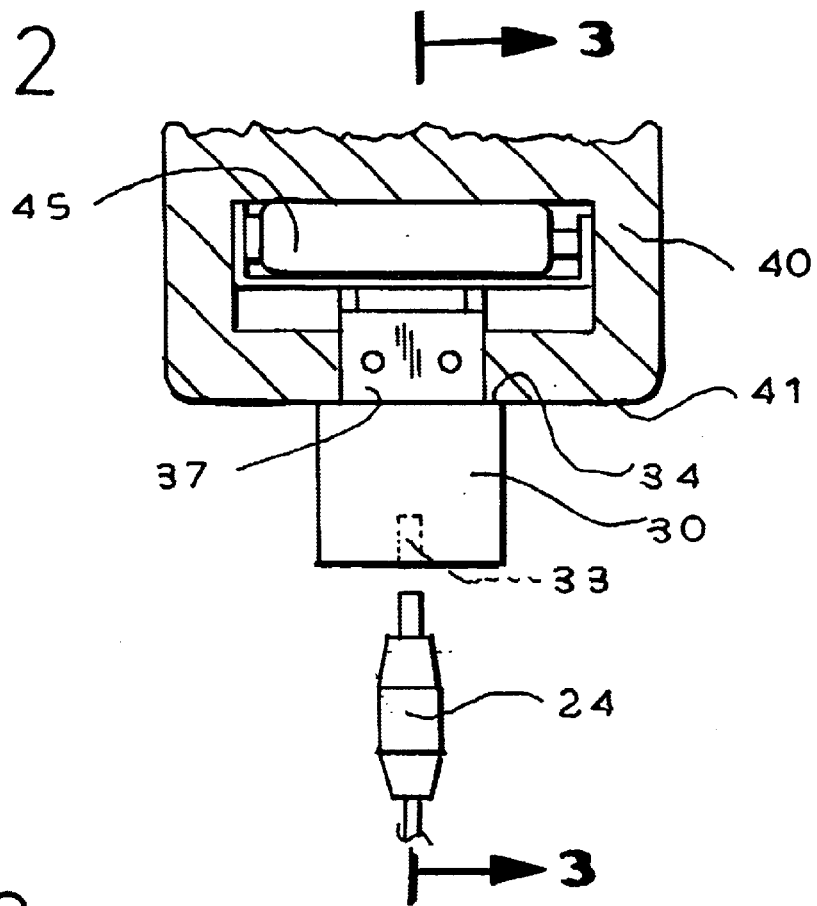
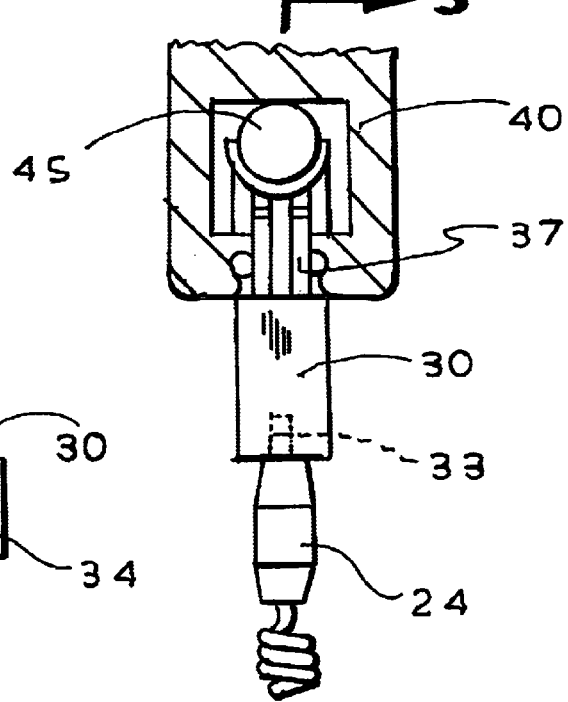
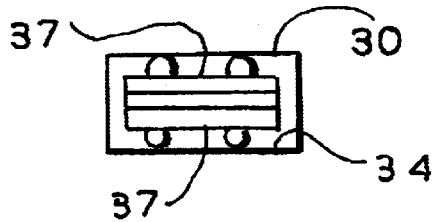

ADAPTER INTERFACE UNIQUE TO EACH MODEL MOBILE TELEPHONE WITH STANDARDIZED CHARGER

FIELD OF THE INVENTION

The field of this invention is adapters for chargers that charge batteries in mobile telephones, and more particularly, such adapters as part of an assembly that are used with chargers that charge batteries that remain embedded in the mobile telephone while being charged.

BACKGROUND OF THE INVENTION AND DISCUSSION OF THE PRIOR ART

Mobile telephones come in many different varieties. When purchased, the consumer also purchases a charger to recharge the rechargeable battery that is inside the mobile telephone. It is common for batteries of the mobile telephone to run out of charge while in the midst of use. Such situations often happen when the user of the mobile telephone is not near his charger. For example, the user may be walking on the street or may be in the office while the charger may be home or in the car. Commonly, in such situations, the user approaches other individuals in the office or on the street and asks to borrow the other person's mobile telephone charger to recharge the battery inside the user's mobile telephone. The problem is that the charger of one mobile telephone is usually not compatible with the battery in other mobile telephones. There is a compelling need to standardize the chargers or find some other way that any user who runs out of electrical energy and needs to borrow someone else's charger is likely to succeed in finding a second user whose mobile telephone charger is compatible with the first user's mobile telephone.

A second problem with having non-standardized chargers for mobile telephones is that each time someone purchases a new mobile telephone that purchaser must also purchase a new charger compatible with the new mobile telephone.

Mobile telephones have the ability to be charged in one of two ways: (1) either to charge the battery while the battery is in the phone with a relatively small charger (2) or else take the battery out of the phone and place it on a flat charger that is somewhat larger than the charger in the first way. With respect to the second way, U.S. Pat. No. 6,014,010 discloses a charger that is compatible with different-sized rechargeable batteries of mobile telephones. The '010 patent standardizes chargers used with detachable batteries by providing an adapter for such chargers. Therefore the user does not have to buy new chargers but rather only has to buy new adapters. This solves the second problem mentioned above—the cost of having to buy new chargers. The '010 patent solves this problem with respect to mobile telephones whose batteries are charged after being removed from the mobile telephone.

In order to address the first problem of not being able to readily borrow a charger that is compatible with one's mobile telephone battery, the '010 patent would require that first user constantly carry around the relatively bulky adapter. This is not much better than having to carry around one's own charger all the time. But if a person would take the trouble to carry around his or her own charger, there would never have been a problem in the first place necessitating borrowing a charger. In other words, people do not carry around their chargers everywhere because they are bulky.

There is a compelling need to be able to borrow charging power from neighbors likely to have compatible chargers in a way that does not require carrying around a bulky object in addition to the mobile telephone itself. With mobile telephones becoming smaller and smaller, users have diminished tolerance for carrying around a bulky charger. They also have diminished tolerance for carrying around a relatively bulky adapter, something that would seem to be required by a user of the '010 patent who wants to be able to borrow electrical charging power from other mobile telephone users.

Moreover, the '010 patent does not address standardizing the large category of chargers that are designed charge mobile telephone batteries while the battery remains embedded inside the mobile telephone—the first way of charging batteries mentioned above. This is also important because the flat somewhat larger charger used to charge external battery packs are not as common as the smaller charger for internal batteries.

SUMMARY OF THE PRESENT INVENTION

The assembly apparatus of the present invention solves both the problem of being able to borrow other users' chargers without having to carry around any other bulky object (besides the mobile telephone itself) and avoids the necessity of having to constantly purchase a new charger each time a new model mobile telephone is purchased. The assembly of the present invention is also specifically useful for mobile telephones that are charged while the battery remains in the phone. The present invention eliminates the problem of getting stuck without a charger and being unable to borrow a compatible charger from someone near you. With the present invention, the adapter is very small and is attachable to the mobile phone externally in a manner that allows the adapter to stick to the phone regardless of the position that the phone is in. Since the adapter that you have need only be stuck to the phone and carried with the phone, it is more convenient and since you always have your adapter with you, you are never left without access to a charger since you can adapt to anyone else's charger.

IMPORTANT OBJECTS AND ADVANTAGES

The following important objects and advantages of the present invention are:

(1) to provide an adapter and charger assembly that is capable of charging a battery of any mobile telephone in which the battery of said mobile telephone is charged while the battery remains embedded in the mobile telephone;

(2) to provide an adapter and charger assembly that standardizes the size and shape of chargers in that the member projecting from the charger is of a standard size and shape, (3) to provide an adapter and charger assembly that allows its owner to conveniently borrow electrical chargers from other owners of other makes and models of mobile telephones and chargers;

(4) to provide an adapter and charger assembly wherein the adapter interface comes in varying models having different second male connecting members projecting therefrom uniquely compatible with a particular make and model mobile telephone;

(5) to provide an adapter and charger assembly that includes an adapter interface that is compact and lightweight;

(6) to provide an adapter and charger assembly that includes an adapter interface that is sufficiently compact and lightweight that said adapter interface can hang from a mobile telephone in a connected position without falling;

(7) to provide am adapter and charger assembly that includes an adapter interface that is sufficiently compact and lightweight that it stays connected to the phone regardless of the position that the phone is held in.

(8) to provide an adapter and charger assembly that includes an adapter interface that is sufficiently compact that the diameter of said adapter interface does not significantly exceed the diameter of most models of mobile telephone;

(9) to provide a standardized charger of an adapter and charger assembly so that users can avoid having to buy a new charger with each purchase of a new mobile telephone;

(10) to provide an adapter and charger assembly wherein the adapter interface in one embodiment has a length, width and thickness that combined does not exceed approximately three inches;

(11) to provide an adapter and charger assembly wherein the adapter interface when attached to the mobile telephone during charging does not interfere with the telephone user's ability to comfortably hold and speak on the mobile telephone;

(12) to provide an adapter and charger assembly wherein the adapter interface and one side with e female cavity to receive a male connecting member projecting from a side of the charger and a second side having a second male connecting member projecting therefrom that is inserted into a recess of a mobile telephone during charging, the second male connecting member being uniquely compatible with the recess of that model and make mobile telephone;

(13) to provide an adapter and charger assembly wherein the adapter interface is flush against the mobile telephone to make it more comfortable for the user of the mobile telephone to hold and use the mobile telephone while the adapter interface is attached thereto.

BRIEF DESCRIPTION OF THE DRAWINGS

FIG. 2 is a cross-sectional view of the adapter of the present invention snapped into a battery of a mobile telephone and with the male connecting member of the charger element exploded away.

FIG. 3 is a cross sectional view taken along line 3—3 of FIG. 2

DETAILED DESCRIPTION OF THE PREFERRED EMBODIMENT

Figure 1:
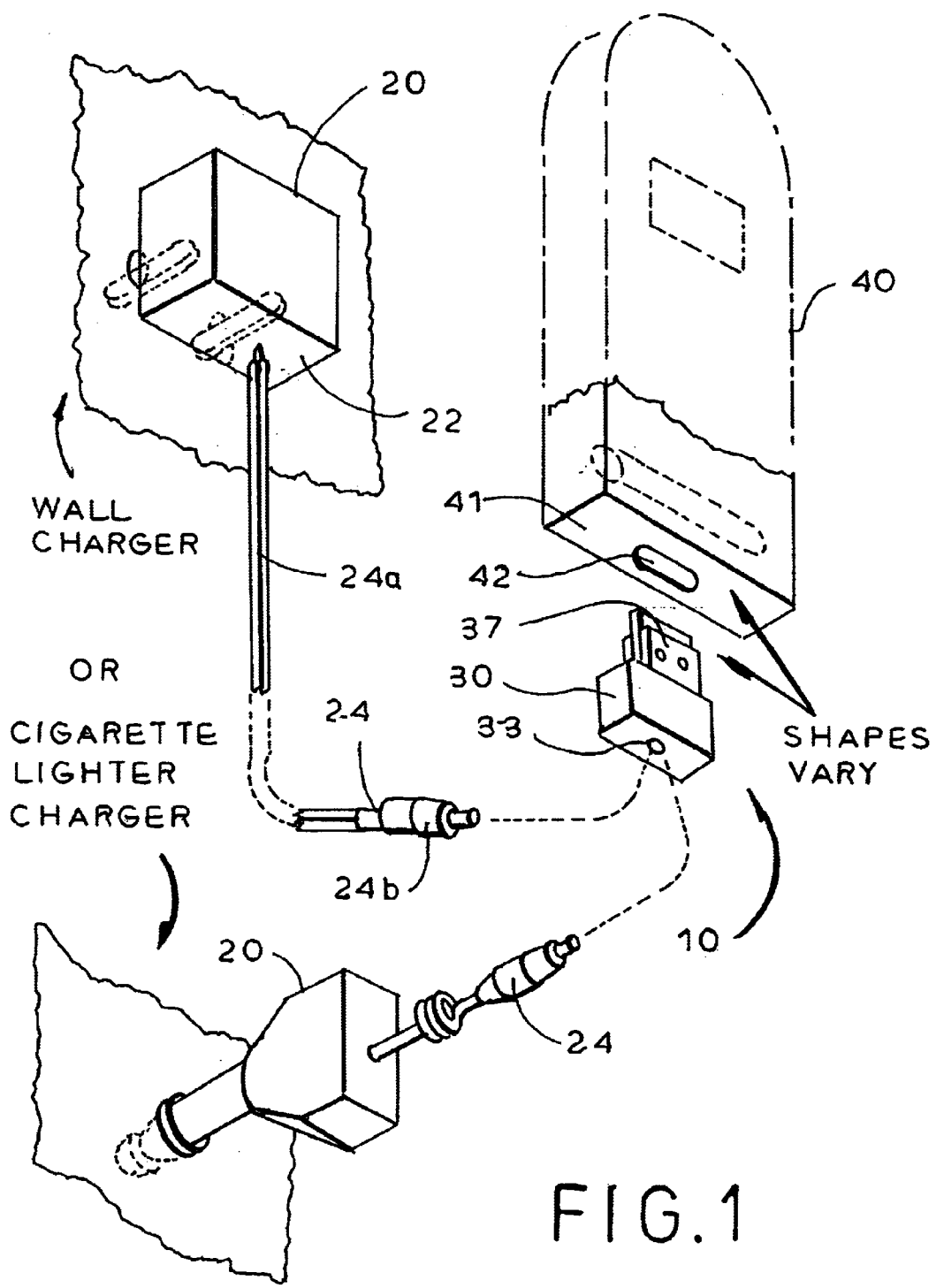
FIG. 1 is an exploded view of the adapter and charger assembly of the present invention with two different types of charger sources.

The apparatus of the present invention will now be illustrated by reference to the accompanying drawings. The overall adapter and charger assembly of the present invention has been assigned reference numeral 10 Other elements have been assigned the reference numerals referred to below. The following phrases are to be treated as synonymous in this patent application: (i) charger and adapter interface assembly, (ii) adapter interface and charger assembly, (iii) charger and adapter assembly and (iv) adapter and charger assembly.

As seen from FIGS. 1–5, a charger and adapter interface assembly 10 is presented in which this assembly 10 is compatible with any nonremovable rechargeable battery of a mobile telephone. Charger element 20 has a male connecting member 24 projecting from a side 22 of charger element 20. Typically, male connecting member 24 projects from side 22 of charger element 20 in a direction that is perpendicular to said side 22 but male connecting member 24 may include a wire 24a from the point at which male connecting member 24 leaves side 22 until the portion of male connecting member 24 that actually mates with the female cavity 33 of adapter interface 30. Male connecting member 24 of charger element 20 is of a particular size and shape that would be considered "standard". In that sense the charger element 20 has been standardized. This means that regardless of the make and the model of mobile telephone intended to be charged by charger element 20, as long as the battery of the mobile telephone is of the kind that is charged while the battery is in the telephone (sometimes called "nonremovable") or that is normally charged while remaining embedded in the mobile telephone, a user, by simply maintaining ready access to an adapter interface 30 that is uniquely compatible with that user's mobile telephone, the user will be in a position to borrow the charger element of any neighbor, friend or other nearby individual when that user's mobile telephone runs out of electrical charge. This assumes, of course, that the advantages of the standardized charger of the adapter and charger assembly of the present invention have become sufficiently recognized and in use that many people have the standardized charger element 20.

Other characteristics of the charger elements 20 are also standardized. For example, the voltage, the current and the polarity are fixed and common to all chargers. It is the understanding of the inventor that this would not be difficult since presently mobile telephones of differing makes and models for use in the United States have the same voltage, current and polarity anyway.

FIG. 1 shows an exploded view of the adapter and charger assembly of the present invention with a charger source that plugs into a wall (see upper view of charger in FIG. 1) and with a charger a charger source in a vehicle such as a cigarette lighter (see lower view of charger in FIG. 1).

Assembly 10 also includes an adapter interface 30 having a female cavity 33 defined on a first side 32 of adapter interface 30 such that the female cavity 33 is able to removably receive the male connecting member 24 so as to make adapter interface 30 be in electrical contact with charger element 20. Adapter interface 30 also has on a second side 34 thereof what is referred as second male connecting member 37. Second male connecting member 37 is uniquely compatible with a recess 42 defined on a wall 41 of a mobile telephone 40 such that insertion of the second male connecting member 37 into the recess 42 places the rechargeable battery 45 in the mobile telephone 40 in electrical contact with adapter interface 30 (and also with charger element 20 provided male connecting member 24 of charger element 20 has been inserted into female cavity 33 of adapter interface 30). Recess 42 is unique for a particular model of mobile telephone 40 in that each model from the same or a different manufacturer can have a different shaped recess 42. That is the case already. The only difference is that instead of having to insert charger uniquely designed to be compatible with the particular recess 42 of the mobile telephone 40, with the present invention it is only necessary to insert the second male connecting member of adapter interface 30 into recess 42.

First side 32 of adapter interface 30 and second side 34 of adapter interface 30 need not be although typically are on opposite sides of adapter interface 30.

Second male connecting member 37 would not typically have a wire but rather would be inserted into recess 42 of mobile telephone 40 in a manner such that second side 34 of adapter interface 30 and wall 41 of mobile telephone 40 would be substantially flush against each other, as best seen in FIG. 2. This minimizes the total volume of space occupied by the combination of mobile telephone 40 and adapter interface 30. This is helpful because as described further below, adapter interface 30 is typically kept attached to mobile telephone 40 at all times.

Another important feature of adapter interface 30 is that adapter interface 30 is light weight and compact. Adapter interface 30 is light enough to have second male connecting member 37 plugged into to the recess 42 in the mobile telephone and remain plugged into regardless of the orientation of mobile telephone 40 and even if adapter interface 30 is hanging down below the mobile telephone 40, as seen in FIG. 1. That is, the frictional fit of second male connecting member 37 of adapter interface 30 in recess 42 of mobile telephone 40 is stronger than the weight of adapter interface 30. The is primarily due to the lightness of adapter interface 30 that is caused by adapter interface 30 being of small dimensions. Hence, when the mobile telephone is held in any orientation after the second male connecting member 37 of the adapter interface 30 has been inserted into recess 42 of the mobile telephone, the adapter interface 30 remains attached to the mobile telephone and does not disconnect from said mobile telephone.

Figure 4:
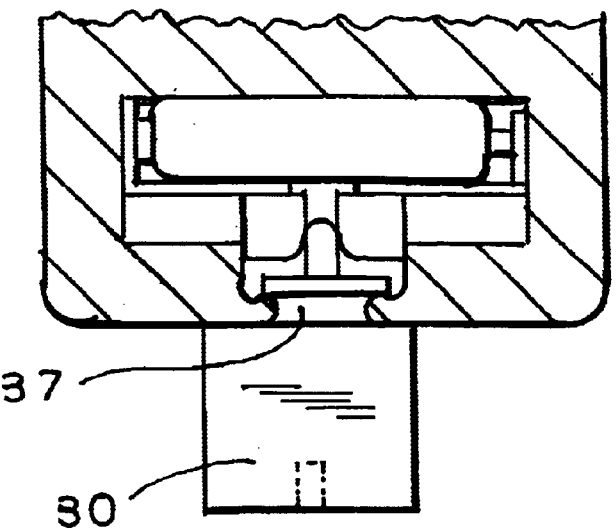
FIG. 4 is a cross-sectional view of an alternative embodiment of an adapter of the present invention snapped into a battery of a mobile telephone
Figure 5:
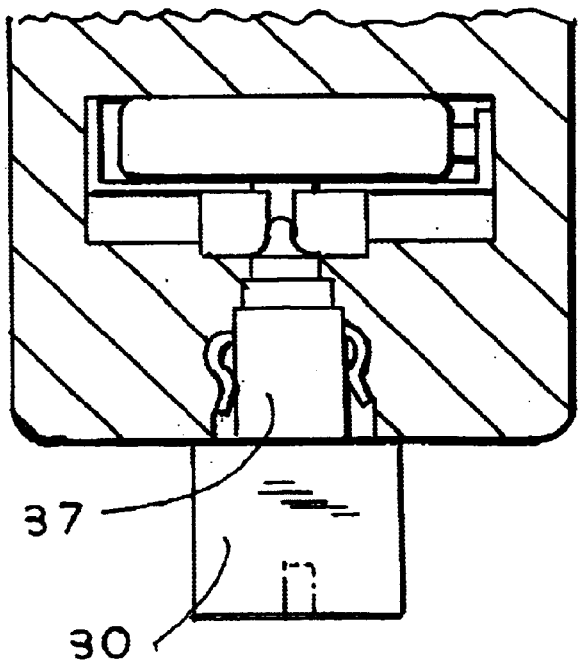
FIG. 5 is a cross-sectional view of a second alternative embodiment of an adapter of the present invention snapped into a battery of a mobile telephone

FIGS. 4 and 5 show adapter interface 30 inserted into mobile telephone 40 but these figures show alternative shapes and sizes of second male connecting member 37. Assembly 10 of the present invention may be sold with a single standard charger element 20 and with numerous adapter interfaces 30 to cover the entire range of makes and models of mobile telephone 40. Alternatively, assembly 10 of the present invention may be sold with a single standard charger element 20 and with a single adapter interface 30 that is compatible with the particular mobile telephone 40 that the user has or is purchasing. Then, whenever, the user purchases a new make or model of mobile telephone 40, the user would purchase additional adapter interfaces 40 suited for the new models/makes of mobile telephone 40. In either case, the user would have an adapter interface 30 compatible with his or her own mobile telephone 40 and would maintain said adapter interface 30 connected to the mobile telephone 40 at all times. In the event the user needs to borrow electric charger from someone that user need only find a second user who has the standard charger element 20.

Adapter interface 30 typically is boxy in shape and has a substantially uniform length, a substantially uniform width and a substantially uniform thickness. The present invention, however, also contemplates adapter interface 30 being curved. However, in either case, the outer shape of adapter interface 30 should be plain except for second male connecting member 37 on its second side and female cavity 33 on the first side. Accordingly, adapter interface 30 need not have any significant projecting members or elements on any of its six sides with the exception of the second male connecting member 37.

In order to be compact, the total sum of the three dimensions (length, width, thickness) of adapter interface 30 in inches should ideally not exceed approximately three inches, although the present invention contemplates an adapter interface whose three-dimensional sum exceeds this amount. An example of desirable dimensions for adapter interface 30 may be approximately three-quarters of an inch in each dimension adding up to a total of approximately two and one quarter inches. It also stands to reason that for mobile telephones 40 that are larger and hence have a larger bottom area, the dimensions of adapter interface 30 could be greater than for mobile telephones 40 that are smaller and have a smaller bottom area and still achieve one of the purposes of the present invention, namely to allow the adapter interface 30 of the present invention to not interfere with use of the mobile telephone while adapter interface 30 remains connected to mobile telephone 40. In any case, adapter interface 30 should preferably not be of a greater diameter than the bottom area of mobile telephone 40 if the bottom area of the mobile telephone 40 is where adapter interface 30 is attached to the mobile telephone 40.

The compactness of adapter interface 30 enables adapter interface 30 to not interfere with the ability of the user of mobile telephone 40 to comfortably hold mobile telephone 40 and to comfortably speak on mobile telephone 40 while adapter interface 30 is attached to mobile telephone 40, i.e. after the second male connecting member 37 has been inserted into recess 42 of mobile telephone 40. The compactness of adapter interface 30 enables adapter interface 30 to be mated with the mobile telephone 40 so comfortably that the user can talk on the telephone and not be seriously bothered by the existence of adapter interface 30 projecting from the mobile telephone 40, and typically projecting from the bottom of mobile telephone 40.

It is noted that the circuitry in the adapter interface 30 and in the charger element of charger and adapter interface assembly of the present invention is not shown in FIGS. 1–5 and is well known in the art. The same is true of the circuitry in the mobile telephone itself.

The term "freestanding" when applied to adapter interface 30 means that said adapter interface 30 is independent of and is capable of standing alone from charger element 20 and mobile telephone 40.

It is to be understood that while the apparatus of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed is:

1. A charger and adapter interface assembly compatible with any mobile telephone whose rechargeable battery is recharged while in the mobile telephone, comprising:

a charger element, the charger element having a male connecting member that has a specific size and shape that can be readily standardized, a freestanding adapter interface having a female cavity defined on a first side of said adapter interface that is able to removably receive the male connecting member so as to make the adapter interface electrically in contact with the charger element, the adapter interface having on a second side thereof a second male connecting member, said second male connecting member being uniquely compatible with a recess defined on a wall of a mobile telephone such that insertion of the second male connecting member into the recess places the rechargeable battery in the mobile telephone in electrical contact with the adapter interface, said recess being unique for a particular model of mobile telephone, said adapter interface being sufficiently lightweight that after insertion of the second male connecting member into the recess a weight of the adapter interface would not cause the adapter interface to disconnect from the mobile telephone regardless of the orientation of the mobile telephone and said adapter interface being sufficiently compact that said adapter interface does not interfere with a user holding and talking on the mobile telephone while the adapter interface is attached to the mobile telephone.

2. The charger and adapter interface assembly of claim 1, wherein when the second male connecting member is inserted into the recess of the second side of the adapter interface, the adapter interface and the wall of the mobile telephone are substantially flush against one another.

3. The charger and adapter interface assembly of claim 2, wherein a sum of a length of the adapter interface, a width of the adapter interface and a thickness of the adapter interface does not exceed approximately three inches.

4. The charger and adapter assembly of claim 2, wherein when said adapter interface is attached to the mobile telephone in an area of the bottom of the mobile telephone after insertion of the second male connecting member into the recess the adapter interface does not stick out of the mobile telephone other than in a single dimension.

5. The charger and adapter interface assembly of claim 1, wherein a sum of a length of the adapter interface, a width of the adapter interface and a thickness of the adapter interface does not exceed approximately three inches.

6. An adapter interface compatible with any mobile telephone whose rechargeable battery is recharged while in the mobile telephone, comprising:

a free-standing adapter interface having a female cavity defined on a first side of said adapter interface that is able to removably receive a male connecting member of a charger element, said male connecting member of the charger element being of a predetermined size and shape that can be readily standardized, so as to make the adapter interface electrically in contact with the charger element, the adapter interface having on a second side thereof a second male connecting member, said second male connecting member being uniquely compatible with a recess defined on a wall of a mobile telephone such that insertion of the second male connecting member into the recess places the rechargeable battery in the mobile telephone in electrical contact with the adapter interface, said recess being unique for a particular model of mobile telephone, said adapter interface being sufficiently lightweight that after insertion of the second male connecting member into the recess a weight of the adapter interface would not cause the adapter interface to disconnect from to the mobile telephone regardless of the orientation of the mobile telephone and said adapter interface being sufficiently compact that said adapter interface does not interfere with a user holding and talking on the mobile telephone while the adapter interface is attached to the mobile telephone.

7. The adapter interface of claim 6, wherein when the second male connecting member is inserted into the recess the second side of adapter interface and the wall of the mobile telephone are substantially flush against one another.

8. The adapter interface of claim 6, wherein a sum of a length of the adapter interface, a width of the adapter interface and a thickness of the adapter interface does not exceed approximately three inches.

9. The adapter interface of claim 6, wherein a sum of a length of the adapter interface, a width of the adapter interface and a thickness of the adapter interface does not exceed approximately three inches.

10. The adapter interface of claim 7, wherein when said adapter interface is attached to the mobile telephone in an area of the bottom of the mobile telephone after insertion of the second male connecting member into the recess the adapter interface does not stick out of the mobile telephone other than in a single dimension.

* * * * *